United States Patent [19]

Deguchi

[11] 4,071,149
[45] Jan. 31, 1978

[54] APPARATUS FOR PILING APERTURED ARTICLES IN STACKS FOR STORAGE

[75] Inventor: Osamu Deguchi, Iwata, Japan

[73] Assignee: NTN Toyo Bearing Co. Ltd., Osaka, Japan

[21] Appl. No.: 698,595

[22] Filed: June 22, 1976

[30] Foreign Application Priority Data

June 24, 1975 Japan ................................ 50-78953
June 24, 1975 Japan ................................ 50-78955

[51] Int. Cl.² ........................................... B65G 57/24
[52] U.S. Cl. ................................. 214/6 P; 214/6 BA;
214/7; 214/152; 294/83 AA; 294/96
[58] Field of Search .................... 214/7, 6 P, 6 F, 6 G, 214/8, DIG. 1, DIG. 3, DIG. 4, 6 BA, 152; 294/83 AA, 96, 87 R

[56] References Cited

U.S. PATENT DOCUMENTS

| 1,605,273 | 11/1926 | Norton et al. | 214/DIG. 1 |
| 1,724,304 | 8/1929 | Newnam | 214/6 F |
| 2,888,294 | 5/1959 | Savarieau | 294/83 AA |
| 3,050,198 | 8/1962 | Schmunk et al. | 214/7 |
| 3,329,286 | 7/1967 | Kurczak | 214/6 P |
| 3,861,536 | 1/1975 | Braner et al. | 214/6 G |

FOREIGN PATENT DOCUMENTS

| 553,436 | 2/1958 | Canada | 214/DIG. 1 |
| 1,102,639 | 3/1961 | Germany | 294/83 AA |

Primary Examiner—Frank E. Werner
Assistant Examiner—Ross Weaver
Attorney, Agent, or Firm—Hall & Houghton

[57] ABSTRACT

An apparatus is disclosed wherein annular articles conveyed one by one to a chute member are successively transferred to a rail member connected to the chute member until a predetermined number of articles are lined up thereon, whereupon a plurality of slender holders waiting their turn above the individual articles are lowered and then lifted in unison, whereby the holders pass through the apertures of the articles in their downward travel and in their upward travel they lift the articles in unison which are held in position as a result of projectable members installed at the front ends of the holders being projected in connection with the upward movement of the holders, the above operation being repeatedly carried out a plurality of times until each holder is loaded with a desired number of articles piled in a stack, the stacks of articles on the individual holders being then released in unison onto a table member, the latter being adapted to be inched each time it receives the stacks so that such articles are piled in a plurality of rows of stacks on the table member. Details of the apparatus will be made clear.

6 Claims, 6 Drawing Figures 4,071,149

APPARATUS FOR PILING APERTURED ARTICLES IN STACKS FOR STORAGE

BACKGROUND OF THE INVENTION a. Field of the Invention

The present invention relates to an apparatus for piling annular articles having apertures in a plurality of rows of stacks on a table member.

b. Objects of the Invention

In the course of production of annular articles, for example, rolling-contact bearings, in great quantities, there are many cases where the products are loaded into some place and then unloaded therefrom or they are subjected to an intermediate treatment. Particularly when products are packaged in a bar form, it is necessary to save labor as much as possible and store products in a compact manner without requiring much space. In brief, in order to provide a smooth flow of production, it is necessary to store products in a plurality of rows of stacks.

SUMMARY OF THE INVENTION

The present invention provides an apparatus arranged so that a predetermined number of annular articles successively conveyed in a line to a rail member via a chute and lined up on the latter are held in unison as a result of the downward and upward movement of a plurality of slender holders waiting their turn above the individual articles, such downward and upward movement of the holders being repeated several times until each holder is loaded with such articles piled in a stack, whereupon the rail member is moved to enable the stacks of articles to be released in unison onto a table member disposed below the rail member, whereupon the table member is inched while the rail member is returned to its original position above the table member, said series of stacking operations being repeated until articles are piled in rows of stacks on the entire surface of the table member.

FEATURES OF THE INVENTION

The present invention permits labor-saved treatment and storage of large quantities of apertured articles being successively conveyed and positioned. The invention prevents products from being damaged by collision and interference and guarantees quality. Further, when products are to be packaged in a bar form, the operation is facilitated and labor-saving can be achieved since such products are piled in stacks in advance. Furthermore, since the apparatus is simple in construction and easy to manufacture, it is inexpensive and compact. Accordingly, the invention provides a very great economic merit, greatly increasing productivity. Particularly, the invention contributes much to labor-saving in handling mass-produced parts or products, such as inner and outer races for bearings and assemblies of inner and outer races.

DESCRIPTION OF THE PREFERRED EMBODIMENTS

Figure 1:
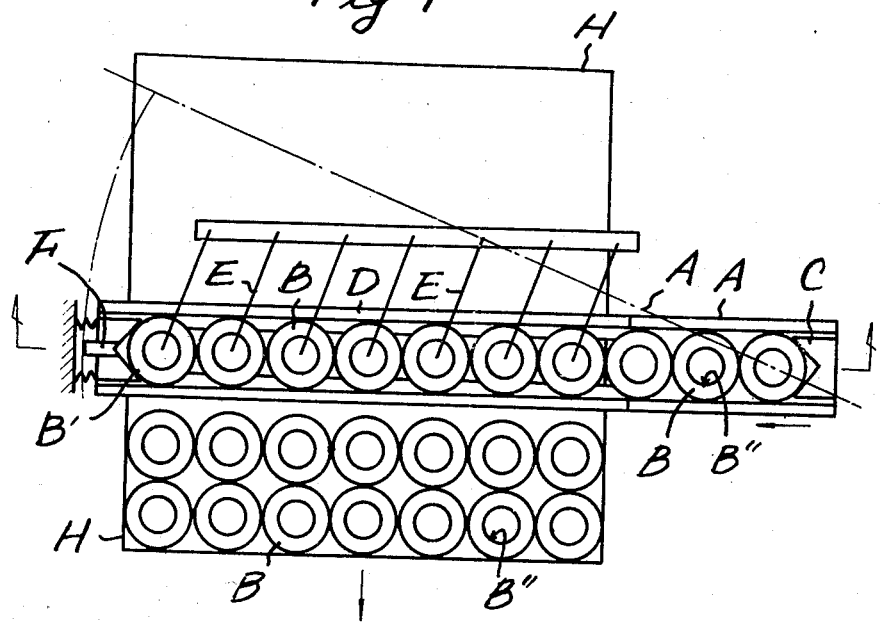
FIG. 1 is a view illustrating the manner in which the apparatus of the present invention operates.
Figure 2:
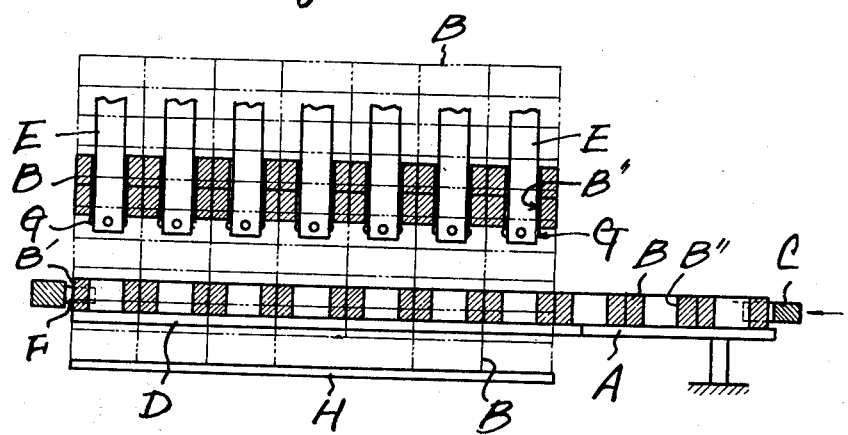
FIG. 2 is a front view thereof.

In FIGS. 1 and 2, annular articles B having apertures B" conveyed one by one to a chute member A are pushed one by one by a pusher member C adapted to be moved back and forth over a distance equal to the outer diameter of the annular articles B, so that they are delivered to a rail member D connected to the chute member A. When a predetermined number of annular articles B are lined up on the rail member D, a predetermined number of holders E disposed above the rail member D so as to be opposed to the respective annular articles are lowered in unison. In addition, the signal indicating that the predetermined number of articles have been lined up is given when a detector F disposed at the end of the rail member D is touched by the foremost annular article B'. When the holders E are lowered until their front ends pass through the apertures B" of the articles B, projectable members G installed in the front end peripheries of the holders E are projected in unison through the peripheries, so that the articles can be lifted in unison in stacked condition in connection with the upward movement of the holders E. When the articles on the rail member D are removed by the downward and upward movement of the holders E, the feeding of articles B to the chute member A and the delivery of articles to the rail member are re-started. In this manner, the operation of stacking articles on the holders E is repeated several times, and when a predetermined number of articles B are stacked on each holder E, the chute A and rail member D are moved from the stacking operation position shown in solid lines in FIG. 1 back to the original position shown in chain lines in FIG. 1, so that a table member H separately prepared is exposed just below the holders E. In this condition, the holders E are lowered and at the end of this lowering movement the projectable members G of the holders E are retracted, so that the annular articles B stacked on the holders E are released onto the table member H. With the projectable members G retracted, only the holders E are returned to their original position, whereupon the table member H is inched in the direction of arrow over a distance corresponding to the pitch between articles, while the chute member A including the rail member D is returned to the stacking operation position shown in solid lines in FIG. 1. Thereafter, the above operation is repeated. The table member H is inched several times until articles B are piled in stacks on the entire surface of the table member H, whereupon one complete operation is finished. What has been described so far refers to the order in which a series of operations of the apparatus of the present invention are carried out.

The arrangement of the apparatus of the invention will now be described with reference to FIGS. 3 through 6.

Figure 3:
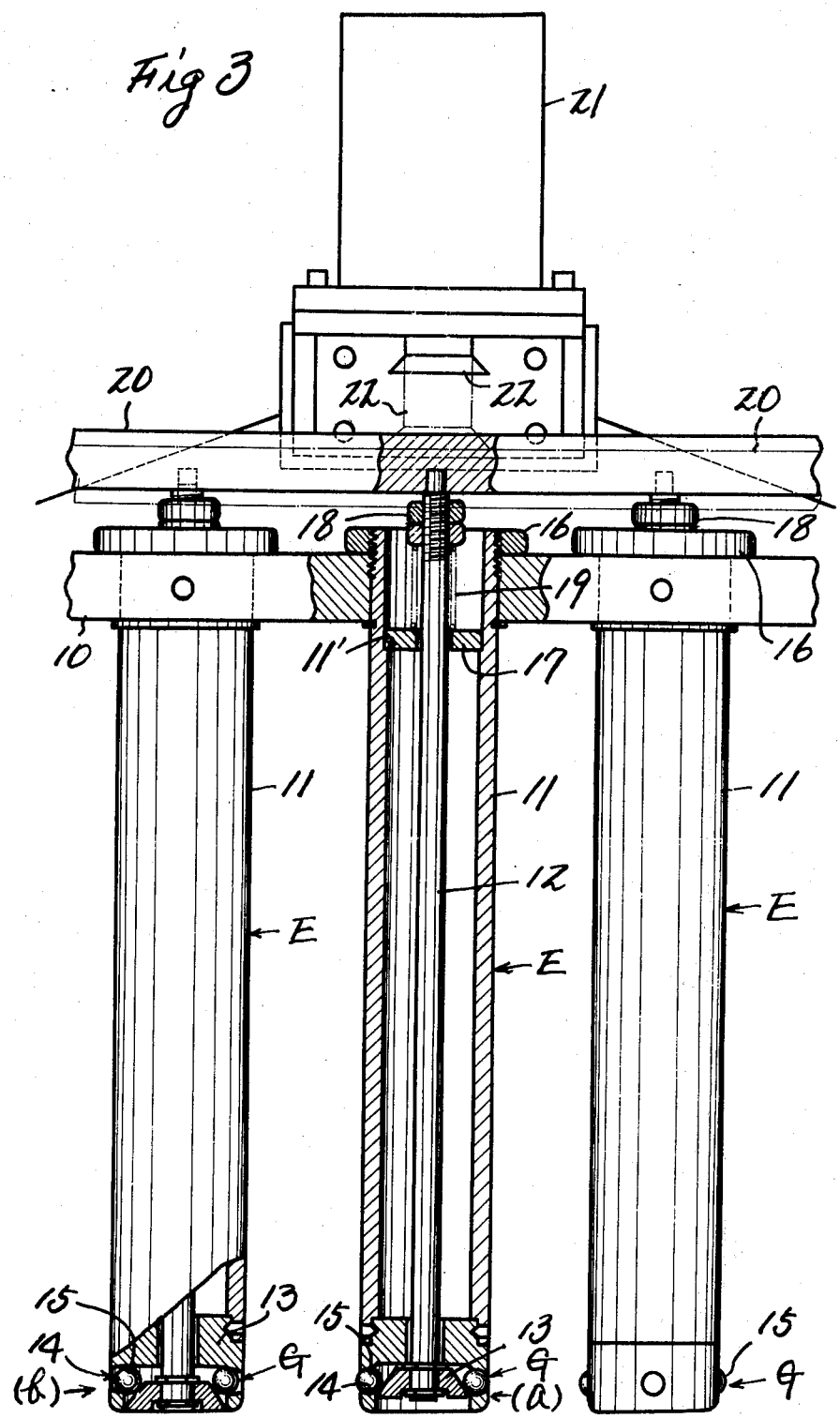
FIG. 3 is a view showing the construction of holders for holding annular articles piled in stacks and releasing them as required.

The holders E, as shown in FIG. 3, are supported by a first plate member 10 at predetermined intervals and extend downwardly therefrom. The first plate member 10 is disposed above the rail member D which is in the stacking operation position, and it is adapted to be lowered and then lifted. The length of the first plate member is approximately the same as that of the rail member. Each holder E comprises a pipe member 11, a bar member 12 vertically slidable within the pipe member 11, a control member 13 fixed to the lower end of the bar member 12, and a plurality of projectable members 15 adapted to be projected through and retracted from windows 14 in the lower peripheral surface of the pipe member 11 by the movement of the control member 13. The arrangement of the holders E will now be described in more detail. The upper ends of the pipe members 11 are passed through the first plate member 10 and have fasteners 16 applied thereto to fix the pipe members in position. The region of each pipe member 11 close to the lower end thereof is provided with a plurality of circumferentially equispaced windows 14 (for example, 3 or 4 windows) for receiving projectable members, such as balls, 15. The control member 13 has a frusto-conical surface and is fixed to the lower end of the bar member 12 vertically extending in the pipe member 11. The bar member 12 is constantly upwardly urged by a spring 19 compressed between a partition plate 17 received on a step portion formed on the inner surface of the pipe member 11 adjacent the upper end thereof and nuts 18 screwed on the upper end of the bar member 12. Designated at 20 is a second common plate member fixed to the upper ends of the bar members 12 and disposed parallel with the first plate member 10. The control member 13 is installed in the lower end opening in the pipe member 11 and associated with the windows 14 on the periphery of the pipe member 11. The condition shown in FIG. 3 (a) is such that the control member 13 is pulled up in the lower end opening in the pipe member 11 by the spring 19, with the projectable members 15 projected outwardly through the windows 14 by the frusto-conical surface of the control member 13. In the condition shown in FIG. 3 (b), the second plate member 20 is pushed down relative to the first plate member 10 to push down the control member 13 in the lower end opening in the pipe member 11 through the intermediary of the bar member 12. That is, the projectable members 15 are retracted in the windows 14. In addition, the second plate member 20 will be pushed down at a predetermined time by the piston rod 22 of a first drive unit 21 such as an air cylinder.

Figure 4:
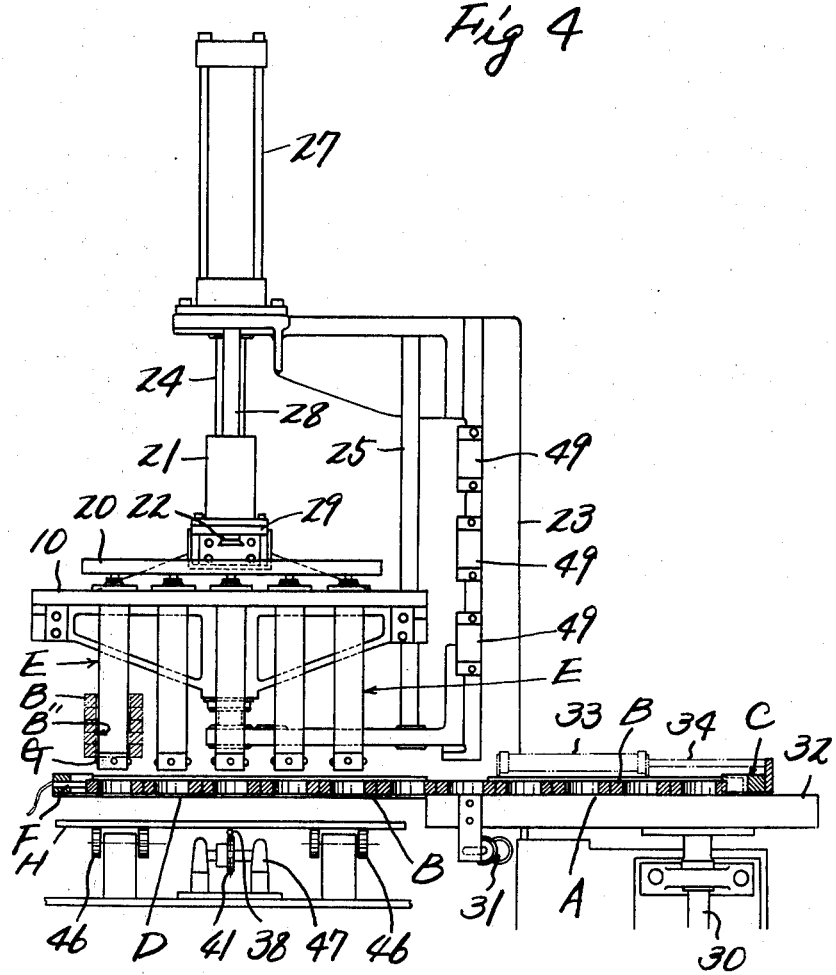
FIG. 4 is a front view of the entire apparatus.
Figure 5:
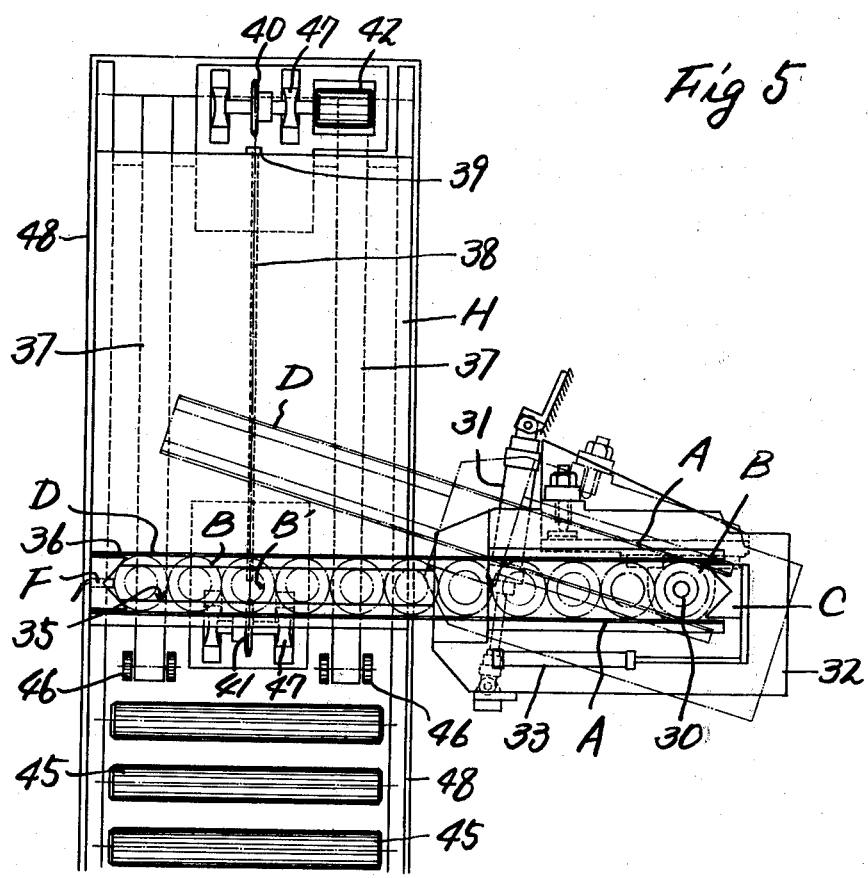
FIG. 5 is a plan view thereof.
Figure 6:
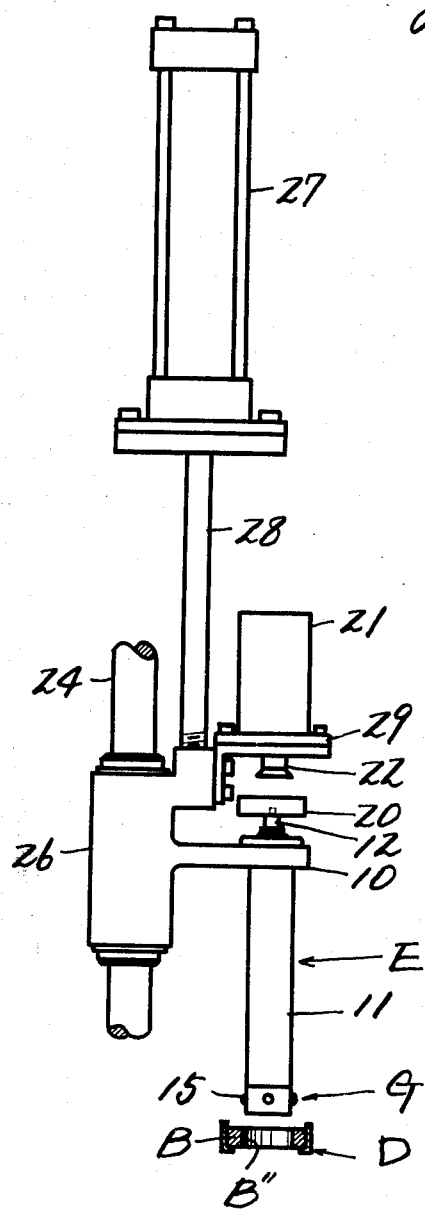
FIG. 6 is an explanatory view showing a construction for upwardly and downwardly moving first and second plate members and holders and for holding them.

The overall arrangement of the apparatus of the present invention will now be described with reference to FIGS. 4 through 6.

The first plate member 10 is vertically guided along two vertically extending guide rods 24 and 25 erected on a frame 23. Thus, the central back area of the first plate member 10 is integrally formed with a portion 26 which is fitted on the central guide rod 24. Further, as shown in FIG. 4, the end of the first plate 10 is formed with a portion which is fitted on the second guide rod 25. The first plate member 10 is connected to the piston rod 28 of a second drive unit 27 such as an air cylinder. The first drive unit 21 for driving the second plate member 20 is mounted on a bracket 29 disposed in the middle of the first plate member 10 so that the front end of the piston rod 22 of the first drive unit 21 is spaced a predetermined distance above the middle of the second plate member 20.

The rail member D and the chute member A are connected together in a line and a revolving shaft 30 therefor is positioned at the end of the chute member A. Thus, a third drive unit 31 such as an air cylinder is adapted to swing the rail member D and chute member A in a horizontal plane through a predetermined angle to position them at the stacking operation position and the original position. Annular articles B are conveyed one by one to the chute member A at a location above the revolving shaft 30. The articles conveyed to the chute member A are inched by the pusher member C driven by a fourth drive unit 33 such as an air cylinder mounted on a swing frame 32. More specifically, the fourth drive unit 33 is mounted on the swing frame 32 so as to extend parallel with the chute member A and has the pusher member C fixed to the front end of the piston rod 34 thereof. As the drive unit 33 is driven, the pusher member C is moved back and forth a distance corresponding to the outer diameter of the annular articles. The rail member D is connected to the front end of the chute member A and has a clearance 35 throughout its length, the width of the clearance being such as to allow the pipe members 11 to pass therethrough. The rail member has lateral plates 36 on opposite sides thereof for preventing the articles from slipping off. Disposed at the front end of the rail member D is the detector F for detecting a predetermined number of articles B having been fed to the rail member D.

The table member H is installed on two support members 37 below the rail member D so as to extend at right angles with the row of holders assuming the stacking operation position. Disposed between the two support members 37 is a chain 38 for inching the table member H. The chain 38 is provided with a hook 39 which is engaged with the rear end of the table member H. The chain 38 is entrained around chain wheels 40 and 41 and adapted to be intermittently driven a predetermined distance by a drive unit 42 such as a motor. Thus, the table member H is inched a distance equal to the outer diameter of the articles B. On the delivery side of the table member H, a roller conveyor comprising a plurality of rollers 45 is installed and also rollers 46 are installed between the end of the support member 37 and the roller conveyor for smoothly guiding and moving the table member H to the roller conveyor. In addition, 47 designates a bearing and 48 designates a frame for receiving a mechanism used for inching the table member H.

With the apparatus of the arrangement described above, a plurality of articles B are lined up on the rail member D and when the detector F detects the same, the second drive unit 27 is actuated to lower the first plate member 10. During this operation, the first unit 21 does not work and hence the front end of the piston rod 22 does not push down the second plate member 20 and the projectable members 15 on the lower end peripheral surfaces of the holders E remain projected. As the front ends of the holders E approach the articles B, the first drive unit 21 is actuated in the course of its downward movement to push down the second plate member 20 to thereby allow the projectable members 15 to be retracted so as to enable the front ends of the holders E to pass through the apertures B″ of the articles B. When the windows 14 at the front ends of the holders E pass through the articles B, the piston rod 22 of the first drive unit 21 is retracted, whereby the projectable members 15 are projected through the peripheral surfaces of the holders E. When the front ends of the holders E pass through the rail member D and approach the table member H, the second drive unit 27 is switched to upward movement, so that the holders E are lifted picking up the articles B from the rail member D. The holders E are pulled up until their lower ends are somewhat above the uppermost articles in the respective stacks each consisting of a predetermined number of articles. As for the time when the projectable members 15 are projected or retracted and the upper and lower limits of the vertical movement of the holders in the above series of operations, a dog mounted on the first plate member kicks limit switches 49 disposed on the frame, thereby giving signals to the first and second drive units. When the articles on the rail member are lifted in unison in the first stacking operation, the second stacking operation is started. In the second stacking operation, et seq., when the front ends of the holders E approach the articles B and the projectable members 15 are retracted, the articles which have been locked on the holders E are allowed to fall onto the articles on the rail member D. Thereafter, these articles B in stacks are lifted in unison as the holders are upwardly moved. The stacking operation described above is repeated several times until a predetermined number of articles are stacked on each holder E. Prior to the subsequent lowering of the holders E, the rail member D and the chute member A swing from the stacking position back to the original position, thereby exposing part of the table member to the stacking position. This operation is effected by a signal given by a counter, which counts the number of operations of the holders, when said number becomes equal to the predetermined number of articles in the individual stacks. That is, the next operation is started when a signal is given for transfer of stacks to the table member. When the front ends of the holders E approach the table member H, the projectable members 15 are retracted and the articles stacked on the holders E are released in unison onto the table member H. Thereafter, with the projectable members 15 retracted, the holders E return to the upper limit of movement. That is, they move upwardly until their lower ends leave the uppermost articles in the stacks. The projectable members 15 make ready for the next stacking operation, kept retracted until the front ends of the holders E pass through the apertures of the articles B. Further, when holders E, emptied, reach the upper limit of movement, a signal is given which actuates the drive unit 42 such as a motor to inch the table member H toward the roller conveyor. That is, the table member H is moved a distance corresponding to the outer diameter of the articles. In connection with the inching movement of the table member or after this movement, the rail member D and the chute member A swing back to the stacking position. In this manner, the stacking operation and transfer of stacked articles to the table member by the series of holders E are repeated until the articles are piled in a number of stacks on the entire surface of the table member H.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

I claim:

1. An apparatus for piling apertured annular articles in vertical stacks for storage comprising an elongated, horizontally disposed rail member, means associated with said rail member for conveying a predetermined number of annular articles thereon in longitudinally aligned and successively positioned relationship, a plurality of vertically disposed and vertically reciprocable holder means corresponding in number to the number of apertured articles on said rail member positioned above said rail member with each holder means being adapted to be in vertical alignment with the aperture of an annular article when positioned thereon, each of said holder means having outwardly projectable retaining means adjacent its lower end thereof, actuating means for moving said holding means downwardly and upwardly and to simultaneously move the retaining means inwardly and outwardly respectively whereby each holder means on its downward movement will have its lower end pass through the aperture of a corresponding annular article and on its upward movement the retaining means will be projected outwardly thereby permitting the annular member to be carried upwardly and retained on the holding means, table means positioned below and at right angles to said rail member for receiving a plurality of vertically stacked apertured annular articles thereon from each of said holding means, and drive means for moving said table means at a predetermined time for a distance equal to the outer diameter of an apertured annular article being processed by the apparatus.

2. An apparatus for piling apertured annular aritcles in vertical stacks for storage comprising an elongated, horizontally disposed rail member, said rail member having a clearance throughout its longitudinal length, a chute member being operatively connected in linear relationship at one end to said rail member and revolving shaft means operatively connected to the other end of said chute means around which the rail member can be swung from an operating position to a stacking position, feeding means for conveying a predetermined number of annular articles from said chute to said rail member in longitudinally aligned and successively positioned relationship, a plurality of vertically disposed and vertically reciprocable holder means corresponding in number to the number of apertured articles on said rail member positioned above said rail member with each holder means being adapted to be in vertical alignment with the aperture of an annular article when positioned thereon, each of said holder means having outwardly projectable retaining means adjacent its lower end thereof, actuating means for moving said holding means downwardly and upwardly and to simultaneously move the retaining means inwardly and outwardly respectively whereby each holder means on its downward movement will have its lower end pass through the aperture of a corresponding annular article and on its upward movement the retaining means will be projected outwardly thereby permitting the annular member to be carried upwardly and retained on the holding means, table means positioned below and at right angles to said rail member for receiving a plurality of vertically stacked apertured annular articles thereon from each of said holding means when said rail member has been swung to a stacking position, and drive means for moving said table means at a predetermined time for a distance equal to the outer diameter of an apertured annular article being processed by the apparatus.

3. An apparatus in accordance with claim 2, wherein the feeding means feed the apertured annular articles one by one to the chute member at a location above the revolving shaft means and thereafter feed said apertured articles one by one to the rail member.

4. Apparatus as set forth in claim 1, which further includes a first vertically movable plate member secured to the upper ends of said holder means, each of said holder means comprising a pipe member having a diameter such that the pipe member is allowed to pass through the aperture of the article, a bar member vertically movable in the pipe member, a control member fixed to the lower end of the bar member, a spring for constantly upwardly urging the bar member, windows disposed on the lower end periphery of the pipe member, and the projectable retaining means adapted to be projected and retracted through said windows.

5. Apparatus in accordance with claim 4, wherein a second plate member is positioned above the first plate member, said second plate member being connected to the upper ends of the bar members projecting above the first plate member and drive means for pushing down said second plate member.

6. A method for piling apertured annular articles in vertically stacked relationship for storage comprising feeding a predetermined number of apertured articles in a longitudinally aligned horizontally positioned row, one after the other, on rail means, moving a plurality of holding means vertically downwardly to pass through the aperture of and to engage each of said annular articles, withdrawing said holding means upwardly with said annular articles being carried thereby, feeding a second group of apertured annular articles to said rail means, again moving the holding means downwardly and upwardly to engage and remove the second group of apertured annular articles from the rail means, repeating the feeding and withdrawal operation just described until a plurality of apertured annular articles are positioned on said holding means, swinging rail means to one side and thereafter place the plurality of stacks of annular articles on work table means and withdrawing the holding means upwardly leaving a plurality of vertical stacks of apertured articles thereon.

* * * * *